(No Model.)

S. C. DYKE.
MACHINE FOR MOLDING MARBLES FROM PLASTIC MATERIAL.

No. 463,418. Patented Nov. 17, 1891.

Witnesses

Inventor
Samuel C. Dyke

UNITED STATES PATENT OFFICE.

SAMUEL C. DYKE, OF AKRON, OHIO, ASSIGNOR TO THE AMERICAN MARBLE AND TOY MANUFACTURING COMPANY, OF SAME PLACE.

MACHINE FOR MOLDING MARBLES FROM PLASTIC MATERIAL.

SPECIFICATION forming part of Letters Patent No. 463,418, dated November 17, 1891.

Application filed June 27, 1891. Serial No. 397,696. (No model.)

*To all whom it may concern:*

Be it known that I, SAMUEL C. DYKE, a citizen of the United States, residing at Akron, in the county of Summit and State of Ohio, have invented a certain new and useful Improvement in Machines for Molding Marbles from Plastic Materials, of which the following is a specification.

My invention has relation to improvements in machines for mechanically rolling slugs or billets of clay or analogous material while in a soft and plastic state into spherical; and it has for its object the production of a machine that will receive the plastic material in the form of billets or slugs, roll the same from different sides, and deliver them in a substantially spherical shape.

To the aforesaid object my invention consists in the peculiar and novel construction, arrangement, and combination of parts hereinafter described and then specifically claimed, reference being had to the accompany drawings, which constitute a part of this specification.

Figure 1:
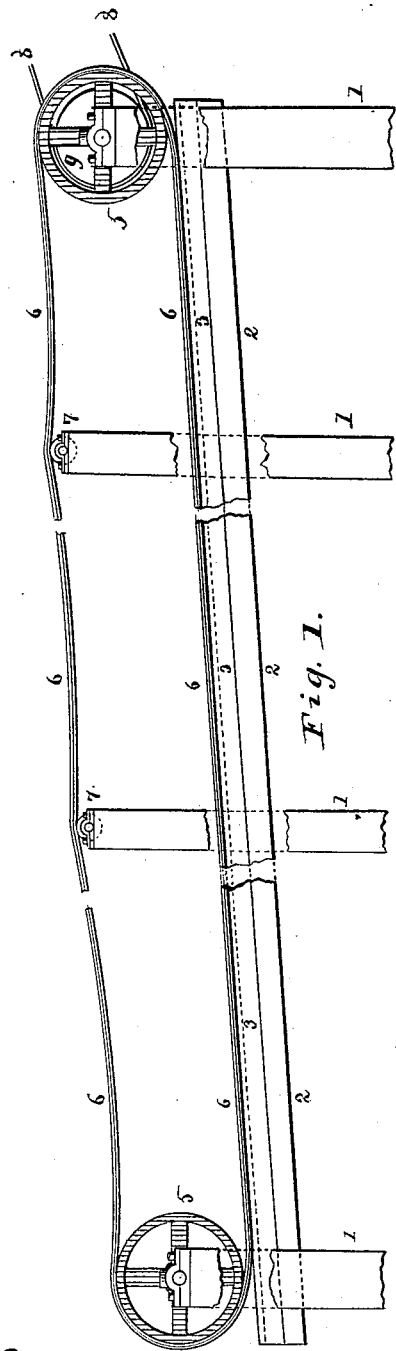
Figure 2:
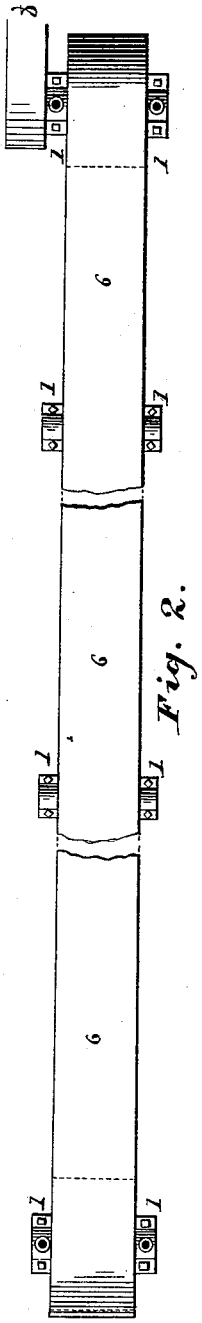
Figure 3:
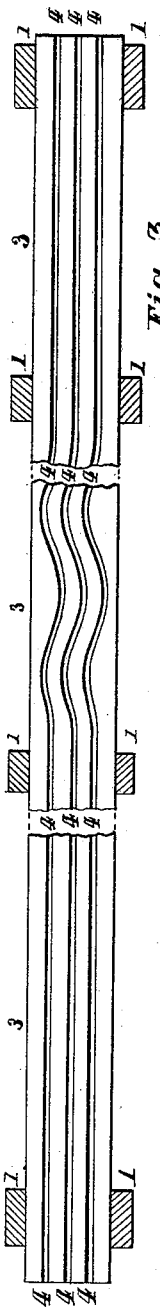

In the accompanying drawings, in which similar reference-numerals indicate like parts in the different views, Figure 1 is a side elevation of my improved marble-rolling machine, broken in places to indicate that it extends beyond the limits shown in the figure; Fig. 2, a top elevation or plan of the same, similarly broken; Fig. 3, a plan of the grooved bed, similarly broken, showing the longitudinal configuration of the grooves and their serpentine parts to cause a lateral partial rotation of the billets, as hereinafter described; and Fig. 4, a vertical transverse section, enlarged, of the bed, showing the peculiar configuration of the grooves therein.

Figure 4:
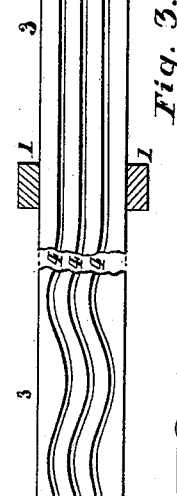

Referring to the drawings, the uprights 1 represent posts, of any approved form or material, supporting a rigid longitudinal base, preferably inclined, as shown, constituting a staging, and on which rests the molding-bed 3. The molding-bed 3, which may be of any approved material, but is preferably of plaster-of-paris, consists of a long table or slab having an even upper plain surface and in which are grooves 4, parallel with each other and with said bed, except as hereinafter stated, varying in number from one upward, according to the requirements of the machine. These grooves in cross-section are of peculiar form, as shown in Fig. 4, and consist of a semicircular bottom of approximately the size of the marbles to be rolled and nearly straight parallel sides extending thence to the face of the table, the depth from the face of the table to the bottom of the groove being slightly less, as one sixty-fourth of the diameter of the marble to be rolled. At a determined part of the molding-bed these grooves are curved horizontally alternately to the right and left in serpentine form, as shown in the intermediate broken part of Fig. 3, and for a purpose to be stated.

At each end of the machine is a pulley 5, having its shaft journaled in suitable bearings on the uprights 1. These pulleys are preferably of the same diameter, although this is not essential, and both are arranged so that their lower peripheries shall be slightly above the surface of the bed 3. On these pulleys is loosely mounted an endless belt 6, the lower half of which between the pulleys 5 rests and rides on the face of the bed 3, the upper half being supported at intervals by friction-rollers 7. The belt 6 is soft and pliable on its outer surface and is preferably made of a heavy belt of woven fabric covered on the face, which is to be outside with several plies of duck, felt, or other soft fabric, retained by stitching or other suitable or approved means. The motion of the belt is such that the part resting on the bed 3 moves from the higher to the lower part thereof, and it is driven by a belt 8, connected with any motor and running on a pulley 9, mounted on the shaft of a pulley 5 at the higher end of the machine. The length of the bed, and consequently of the machine, will vary with the size of the marbles to be rolled and the character of the material employed, but will ordinarily be from sixty to one hundred feet, but may exceed or be less than either limit.

In operation the belt 6 is driven at a low speed and with an even motion, and from the foregoing description it will be understood that its pressure on the bed 3 is such as is due to its weight only, and this pressure may be regulated by increasing or decreasing the tension of the belt. The plastic billets, ordinarily of potter's clay, ground and tempered and of proper size to furnish the required material for the marble, are fed singly into the grooves 4 at the higher end of the bed 3, when they are engaged by the belt 6 and rolled along in said grooves toward and to the lower end of the bed, where they are delivered in spherical form, having been rolled and compressed the entire length of the bed by the belt. If the grooves were straight, however, the entire length of the bed, there will be a tendency for the billets to assume an ellipsoidal instead of a spherical form. Therefore at some place between the ends of the bed they are alternately curved to the left and right, as hereinbefore stated. The result of this is that as the billet turns aside in the groove while the belt moves continuously in the same direction it is turned laterally as well as forward and thereby made spherical. The number of these serpentine curves may be varied and will be determined by the character of the work to be performed by the machine, as will also the size and number of the grooves.

I have shown no device for delivering the billets to or receiving them rounded from the machine, as these are not an essential part of my invention.

What I claim, and desire to secure by Letters Patent, is—

1. In a machine for rolling billets of plastic material into spherical form, a grooved bed, combined with a belt arranged to ride thereon and lengthwise thereof, substantially as shown and described.

2. In a machine for rolling billets of plastic material into spherical form, a bed containing a longitudinal groove in which to roll the billets, said groove being alternately curved in opposite directions between the ends of said bed, combined with a belt arranged to ride on said bed and engage and roll the billets in the groove, substantially as shown and described.

3. The herein-described machine for rolling billets of plastic material into spherical form, consisting of the grooved bed 3, endless belt 6, pulleys 5, and friction-pulleys 7, all constructed and arranged substantially as shown and described.

In testimony that I claim the above I hereunto set my hand.

SAMUEL C. DYKE.

In presence of—
C. P. HUMPHREY,
S. W. ROBINSON.